Feb. 24, 1970  R. R. BREZINSKI  3,496,800
SELF-LOCKING TIE ROD ADJUSTER
Filed Aug. 2, 1968

INVENTOR.
Richard R. Brezinski
BY
W. F. Wagner
ATTORNEY

United States Patent Office 3,496,800
Patented Feb. 24, 1970

3,496,800
SELF-LOCKING TIE ROD ADJUSTER
Richard R. Brezinski, Saginaw, Mich., assignor to General Motors Corporation, Detroit, Mich., a corporation of Delaware
Filed Aug. 2, 1968, Ser. No. 749,664
Int. Cl. F16b 7/06; B23p 13/00
U.S. Cl. 74—586                              4 Claims

ABSTRACT OF THE DISCLOSURE

A self-locking adjustable connector assembly in which a pair of shafts having threads of opposite lead are secured together by an internally threaded tubular member having its wall deformed in cross section to form three uniformly circumferentially spaced radially outwardly extending flutes of generally U-shaped cross section extending longitudinally of the tubular member merging with arcuate portions defining an interrupted wall of circular cross section, the diameter of which is less than the outside diameter of the threads on the respective shafts. The interrupted circular wall is formed with interference fit threads after formation of the flutes so that the turning torque resistance between the threaded shafts and interrupted circular wall is a function of elastic bending deformation of the flutes.

---

This invention relates to self-locking adjustable threaded assemblies and more particularly to constructions thereof particularly adapted for use in tie rod adjuster assemblies.

For many years, certain portions of motor vehicle steering linkage, particularly the tie rod assemblies, have been equipped with threaded axial adjustment means enabling accurate initial alignment or subsequent realignment of the dirigible wheels of a vehicle. In general, the practice has been to fabricate the tie rods in two separate pieces having end portions formed with threads of opposite lead which are surroundingly engaged by a split sleeve or tubular member correspondingly threaded, which when rotated in opposite directions causes elongation or shortening, respectively, of the tie rod. Because of the criticality of steering geometry dependent upon such adjustment, it has been the usual practice to provide the tubular member with clamp portions at either end thereof in the form of radially extending aligned lugs or ears having a bolt and nut assembly extending therethrough which when tightened contracts the tube to maintain its adjusted position.

In recent years, due to increasing complexity of vehicle construction, the presence of a clamping means has produced problems due to the fact that certain angular orientations of the ear type clamps may cause interference with other portions of the vehicle during steering movements. Further, ear type clamping means significantly increase the cost of such asesmblies as well as requiring the additional assembly time involved in tightening the nuts after the adjustment operation is performed.

It is accordingly an object of the present invention to provide a self-locking tie rod adjuster assembly in which locking of the adjuster tube is a function of a predetermined contracting resilience imparted thereto during manufacture, thereby eliminating both the necessity for additional assembly steps or the possibility of failure to perform such step.

Another object is to provide an assembly of the general type described wherein a pair of rod ends having threaded end portions of opposite lead are connected together by a tubular member having radially outwardly deformed longitudinally extending flute portions of generally U-shaped cross section merging with an interrupted wall of circular cross section formed with threads providing an interference fit with the threads of said rod ends, the flutes being preformed to exert a radial inward biasing and circumferential contracting of the interrupted wall to retain the tubular member in any rotational position imparted thereto.

Another object is to provide an arrangement of the stated character in which the tubular member is generally triangular in cross section with each flute portion being disposed in diametric opposite relation to a threaded portion.

The foregoing and other objects, advantages and features of the invention will become more readily apparent as reference is had to the accompanying specification and drawings wherein.

Figure 1:
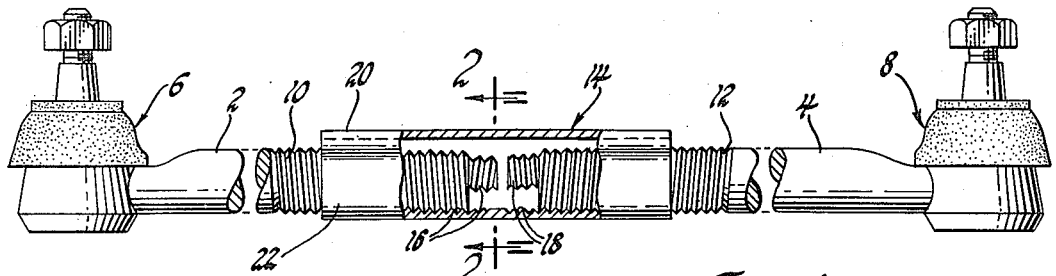
FIGURE 1 is a side elevational view, partly in section and wtih parts broken away, illustrating a tie rod assembly incorporating the invention.

Referring now to the drawings and particularly FIGURE 1, there is shown a preferred embodiment of the invention in which a tie rod assembly comprises a pair of tie rod ends 2 and 4 having ball joint assemblies 6 and 8 formed on their outer ends which engage the usual associated portions of a vehicle steering linkage, not shown. At their inner opposed ends, rods 2 and 4 are formed with threaded end portions 10 and 12 of opposite lead. Surrounding end portions 10 and 12 is a tubular member 14 having internal threads 16 and 18 of correspondingly opposite lead operatively engaging threaded portions 10 and 12.

Figure 2:
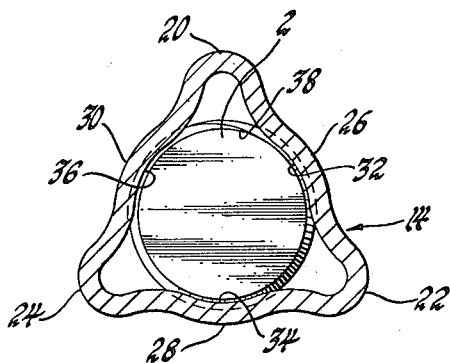
FIGURE 2 is an enlarged sectional view looking in the direction of arrows 2—2 of FIGURE 1.
Figure 3:
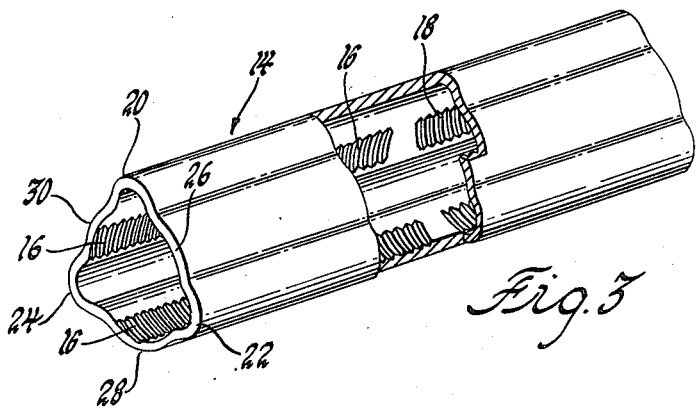
FIGURE 3 is a fragmented perspective view of the tubular adjuster member utilized in the invention.

In accordance with conventional practice, due to the fact that one tie rod end is formed with right hand threads while the other is formed with left hand threads, rotation of member 14 in one direction causes elongations of the assembly while rotation of the member in the opposite direction reduces such length. In order to retain the member 14 in the precise position producing the desired length, in accordance with the present invention the body of the tubular member is initially preformed to a generally triangular cross section as illustrated in FIGURE 2. In the process of deforming member 14 as illustrated, the side walls between the radiused apices 20, 22 and 24 are formed with arcuate portions 26, 28 and 30 having inner surfaces 32, 34 and 36 which coincide within an imaginary circle having a diameter which is less than the root diameter 38 of the threaded ends 10 and 12. After forming the tubular member in the configuration illustrated in FIGURE 2, the arcuate wall portions 26, 28 and 30 are internally threaded as illustrated in FIGURE 3 to provide interrupted threads 16 and 18. Since the threads so formed are undersize in relation to the threads formed on the associated tie rod ends, assembly and subsequent adjustment of the tubular member elastically deforms the U-shaped loops formed by apices 20, 22 and 24 sufficient to produce a high level of resistance to angular displacement from its adjusted positions. Consequently, though adjustment may be made readily with a suitable wrench, absent the wrench, the tendency of the portions 20, 22 and 24 to contract the arcuate threaded portions automatically resists displacement of the tubular member from its adjusted position.

In connection with the foregoing, it is particularly important to note that the internal threads in tubular member 14 are formed after deformation of the tube to its generally triangular cross section. In prior art constructions, it has been the practice to semi-form such tubular members, thread the interior, and then subject the flutes to a second deforming operation while in assembled relation on the threaded shaft. While this technique is satisfactory for certain applications not requiring readjustment, in devices such as herein described, serious abrading or galling of the threads is likely to occur due to localized excessive deformation at the juncture of the flutes with the arcuate portions. Since the present invention totally eliminates the second deforming operation, the possibility of adverse effects resulting therefrom are, of course, similarly eliminated.

According to another feature of the invention, the cross section of the tubular member is preferably in the form of an isosceles triangle with each of the portions 20, 22 and 24 located diametrically opposite a threaded portion, thereby minimizing the possibility of undesirable bending deflection of the entire assembly. In contrast, typical prior art spring action tubular members employ two diametrically oriented flutes which may permit chucking or radial play in a plane containing the flutes.

While but one embodiment of the invention has been shown, and described, it will be apparent that other changes and modifications may be made therein. It is, therefore, to be understood that it is not intended to limit the invention to the embodiment shown.

I claim:

1. An axially adjustable assembly comprising, a pair of rods having threaded ends of opposite lead, a tubular member surrounding said ends, said tubular member having radially outwardly deformed longitudinally extending flute portions of generally U-shaped cross section merging with an interrupted wall of circular cross section formed with threads providing an interference fit with the threads of said rods, each of said flutes being disposed circumferentially about said tubular member in diametric opposite relation to a thread portion.

2. The invention of claim 1 wherein the inner surface of the interrupted wall of circular cross section constitutes at least half the circumference of a circle defined thereby.

3. The method of making a tubular threaded connector comprising the steps of deforming a tube of generally circular cross section into a generally triangular cross section having arcuate portions between the apices defining an interrupted wall of circular cross section, and forming internal threads of opposite lead on said interrupted wall from opposite ends of said member to approximately the center thereof.

4. The method of manufacturing a self-locking threadably adjustable assembly comprising the steps of forming a pair of rods with threaded end portions of opposite lead, deforming a tube of generally circular cross section into a generally triangular cross section having arcuate portions between the apices defining an interrupted wall of circular cross section, forming internal threads of opposite lead on said interrupted wall from opposite ends of said member to approximately the center thereof which are undersize in relation to the threaded end portions of said rods, and threadably assembling said tube over said threaded end portions.

References Cited

UNITED STATES PATENTS

| | | | |
|---|---|---|---|
| 2,596,885 | 5/1952 | Booth | 287—109 XR |
| 3,065,983 | 11/1962 | Flumerfelt | 287—60 |
| 3,229,999 | 1/1966 | Storch | 287—60 |

FRED C. MATTERN, Jr., Primary Examiner

F. D. SHOEMAKER, Assistant Examiner

U.S. Cl. X.R.

29—175; 287—60